United States Patent [19]

Farah et al.

[11] Patent Number: 4,516,241

[45] Date of Patent: May 7, 1985

[54] BIT COMPRESSION CODING WITH EMBEDDED SIGNALING

[75] Inventors: Robert L. Farah, Brooklyn, N.Y.; Stephen M. Walters, Aberdeen, N.J.

[73] Assignee: AT&T Bell Laboratories, Murry Hill, N.J.

[21] Appl. No.: 512,329

[22] Filed: Jul. 11, 1983

[51] Int. Cl.³ .............................................. H04J 3/00
[52] U.S. Cl. .................................... 370/110.1; 375/30
[58] Field of Search ................. 375/30, 33; 370/110.1, 370/111, 118; 358/135

[56] References Cited

U.S. PATENT DOCUMENTS

| | | | |
|---|---|---|---|
| 3,026,375 | 3/1962 | Graham | 375/33 |
| 3,781,685 | 12/1973 | Ching | 325/38 |
| 3,973,081 | 8/1976 | Hutchins | 375/30 |
| 3,973,199 | 8/1976 | Widmer | 375/30 |
| 4,059,731 | 11/1977 | Green et al. | 179/15 |
| 4,100,494 | 7/1978 | Boudewijns et al. | 375/30 |
| 4,109,203 | 8/1978 | Eggermont et al. | 375/30 |
| 4,319,082 | 3/1982 | Gilloire et al. | 375/30 |
| 4,371,972 | 2/1983 | Schwarz et al. | 375/30 |
| 4,385,393 | 5/1983 | Chaure et al. | 375/30 |
| 4,411,001 | 10/1983 | Van Buul et al. | 375/30 |
| 4,411,002 | 10/1983 | Auger | 375/30 |

FOREIGN PATENT DOCUMENTS 2063018  5/1981  United Kingdom ................ 370/111

Primary Examiner—Douglas W. Olms
Assistant Examiner—Kenneth I. Rokoff
Attorney, Agent, or Firm—John K. Mullarney; Thomas Stafford

[57] ABSTRACT

A bit compression coding circuit incorporates signaling bit insertion. An input signal sample(s) representing, for example, PCM encoded speech or voiceband data, is delivered to a difference circuit (31) where a predicted signal ($s_e$) is subtracted from it. The predicted signal is an estimate of the input sample derived from a predictor (32). The resultant difference signal is coupled to the input of an adaptive quantizer (34) which provides at its output a bit compressed quantized differential PCM version of the difference signal. A multiplexer (37) receives the output of the quantizer and serves to periodically preempt the least significant bit of the bit compressed PCM signal and substitute a signaling bit therefor. The output of the multiplexer is coupled to the input of an adder (38) wherein it is added to the predicted signal. The result of this addition is coupled to the input of the predictor, which in response thereto serves to generate the next predicted signal for comparison with the next input signal sample. An adaptation control circuit (36) is responsive to the output of the multiplexer and serves to control the speed of adaptation of the adaptive quantizer.

6 Claims, 4 Drawing Figures

BIT COMPRESSION CODING WITH EMBEDDED SIGNALING

TECHNICAL FIELD

The present invention relates to digital transmission systems and, more particularly, to a bit compression coding technique which incorporates signaling bit insertion.

BACKGROUND OF THE INVENTION

The first step in understanding a transmission system is to define the basic broadband transmission unit. For analog systems, this would be a channel group, which prior to transmission is typically multiplexed into supergroups and mastergroups. For digital transmission, the basic unit is the DS1 signal. The DS1 signal developed by a digital channel bank (e.g., the D-3 Channel Bank, as disclosed in U.S. Pat. No. 4,059,731 issued Nov. 22, 1977 to J. H. Green and J. E. Landry) and transmitted over a T-1 transmission line (1.544 megabits per second) is, at present, the workhorse of the Bell System digital transmission network.

The format of the DS1 digital signal consists of 24 eight-bit words and one framing bit for a total of 193 bits per frame. The 24 words typically represent 24 separate and distinct messages deposited in 24 separate and distinct channels. The words are PCM (pulse code modulation) encoded and the least significant bit (i.e., eight bit) of a channel is periodically dedicated (every sixth frame) for signaling purposes.

Over the past several years there has been increasing interest in achieving a more efficient digital encoding. For an evolving digital network, a most interesting application is the possible replacement of the 64,000 bit-per-second (bps) PCM signal (8 bits per channel, repeated at an 8 kHz rate) for telephony. The reason, of course, is to achieve bandwidth compression, and thus a concomitant increase in transmission capacity. To this end, the patent application of D. W. Petr, Ser. No. 343,355 filed Jan. 27, 1982 discloses an efficient, robust, bit compression algorithm. In accordance with the Petr invention, each 64 Kbps signal is converted or compressed to a 32 Kbps signal thereby doubling the capacity of a T1 line, for example.

Using the Petr algorithm, a pair of DS1 digroups (digital groups) can be bit compressed and multiplexed together to form a digroup of twice the regular (T1) transmission capacity, but with the very same bit rate (1.544 Mbps). However, there remains the problem of signaling. With a DS1 digital signal the least significant bit of a channel is periodically preempted for signaling purposes with little degradation in performance. But, to adopt this teaching and periodically preempt one of the four bits of a sub-rate (32 Kbps) channel for signaling would, normally, impair performance because the necessary coordination between the coder and decoder would be deleteriously affected. Alternatively, two or more subrate channels might be dedicated for signaling purposes. This, however, would reduce the number of channels available for message transmission purposes. Accordingly, while bit compression is potentially most advantageous, it presents its own problems—particularly with signaling transmission.

In accordance with conventional coding practice, the output of an adaptive differential pulse code modulation (ADPCM) coder, for example, is fed back to the coder's predictor where it is used to generate a new signal estimate for comparison with the next input signal sample. Then, in accordance with conventional teaching, the coder output would be delivered to a multiplex circuit for signaling bit insertion purposes. In-band or embedded signaling is, of course, the common method used for signaling transmission in digital communication systems. Unfortunately, this signaling bit insertion affects the coordination between the coder and decoder and, as a consequence, signal-to-noise performance suffers.

SUMMARY OF THE INVENTION

In accordance with the present invention, and contrary to conventional coding practice, the output of the multiplex circuit, including the inserted signaling bits, is coupled back to the predictor of the coder. And, contrary to expectations, an improved signal-to-noise performance is thereby realized. That is, the signaling (or S-bit) insertion operation is incorporated into the ADPCM coding algorithm and a better transmission performance is achieved—vis-a-vis the aforementioned conventional teaching.

In a preferred embodiment of the invention an input signal sample representing, for example, PCM encoded speech or voiceband data, is delivered to a difference circuit where a predicted signal is substracted from it. The predicted signal is an estimate of the input sample derived from a predictor. The resultant difference signal is coupled to the input of an adaptive quantizer which provides at its output a bit compressed quantized differential PCM version of the difference signal. A multiplexer receives the output of the quantizer and serves to periodically preempt the least significant bit of the bit compressed PCM signal and substitute a signaling bit therefor. The output of the multiplexer is coupled to the input of an adder wherein it is added to the predicted signal. The result of this addition is coupled to the input of the predictor, which in response thereto serves to generate the next predicted signal for comparison with the next input signal sample. An adaptation control circuit is responsive to the output of the multiplexer and serves to control the speed of adaptation of the adaptive quantizer to produce a fast speed of adaptation when the PCM input signal represents speech and a slow speed of adaptation for PCM encoded voiceband data.

BRIEF DESCRIPTION OF THE DRAWINGS

The invention will be more fully appreciated from the following detailed description when the same is considered in connection with the accompanying drawings in which.

DETAILED DESCRIPTION

Figure 1:
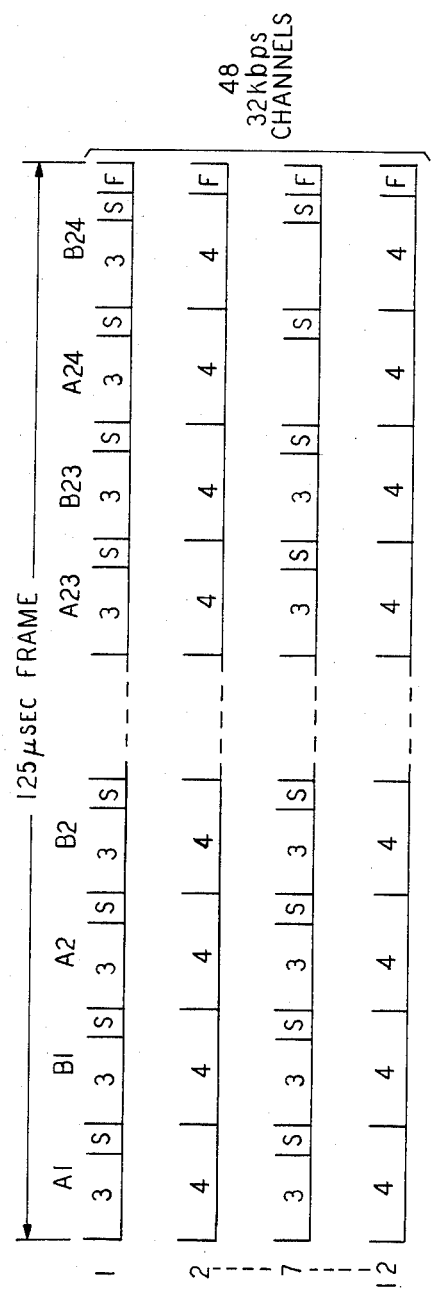
FIG. 1 illustrates the format of a bit compressed, multiplexed signal that is achieved in accordance with the present invention.

FIG. 1 illustrates a bit compressed, multiplexed, digital signal format which is advantageously arrived at in accordance with the principles of the present invention. The format depicted in FIG. 1 is efficient (twice the transmission carrying capacity of DS1), it offers minimal performance degradation, and it is completely transparent to signaling—that is, the signaling bits (e.g., of DS1) are not changed or altered in any manner. The FIG. 1 format is achieved by bit compressing and multiplexing a pair of DS1 signals. However, while the present invention will be described in the context of bit compressing and multiplexing two DS1s, the invention is not so limited; the inventive concepts herein disclosed can be applied to other digital transmission systems which utilize other and different formats.

The 8-bit PCM encoded signals of input (DS1) digroups are bit compressed into 4-bit signals. The bit compressed signals (of input digroups A and B) are time division multiplexed with each other, with the multiplexed compressed signals occupying separate and distinct channels of a repetitive frame (125 μsec). The signaling bits or S-bits are extracted from the pair of input DS1s and are inserted (every 6th frame) into predetermined channels of a bit compressed frame. The signaling bits that are placed in a given channel are associated with the encoded message signal of that channel.

FIG. 1 depicts twelve successive frames of the bit compressed multiplexed signal. Each frame comprises forty-eight 32 Kbps channels (4 bits per channel, repeated at an 8 kHz rate). The input digroups A and B each comprise 24 channels and these, after compression, are multiplexed by interleaving the same; i.e., A1, B1, A2, B2 . . ., where the numerals (1, 2 . . . 23, 24) indicate channels of digroups A and B. The format format includes one framing bit for a total of 193 bits per frame. The input PCM encoded signals are bit compressed to 4-bit ADPCM signals However, every sixth frame (frames 1 and 7 of FIG. 1) the least significant bit of each bit compressed PCM signal is preempted and a signaling bit is substituted therefor. The signaling bit(S) inserted into each 4-bit (ADPCM) channel relates to the encoded message signal of that channel.

Figure 2:
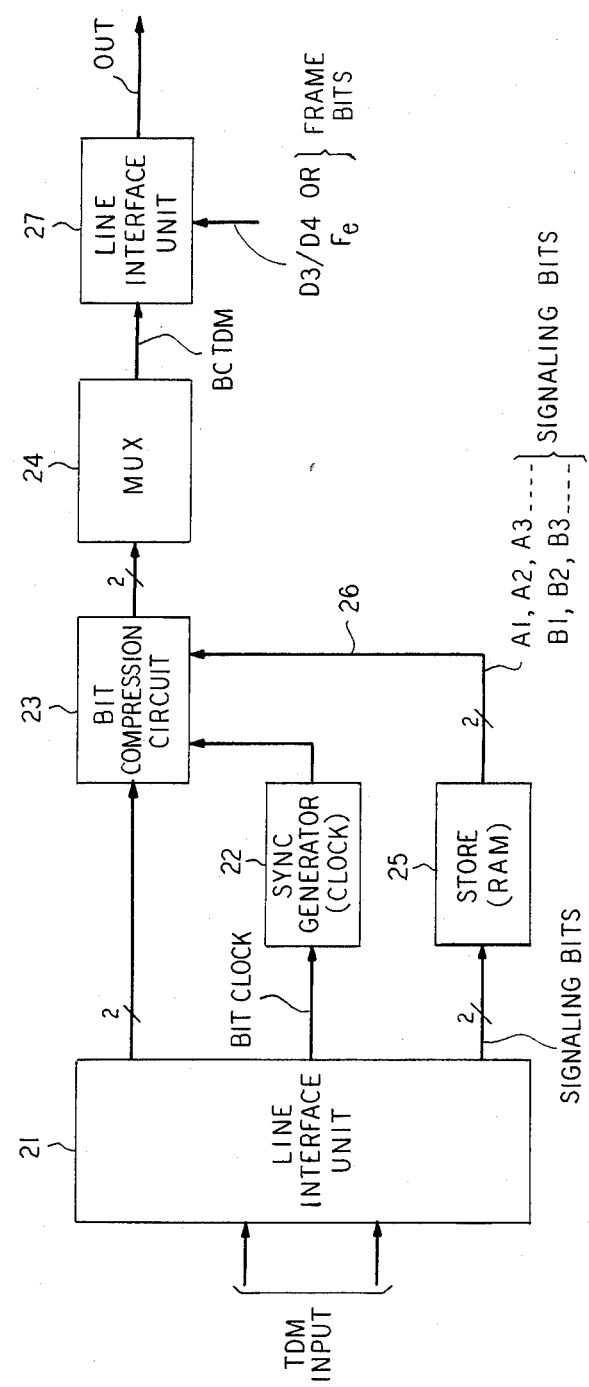
FIG. 2 is a simplified, schematic block diagram of a bit compression multiplexer incorporating a coding circuit in accordance with the present invention.

Turning now to the schematic block diagram of FIG. 2, a pair of time division multiplexed (TDM) digital bit streams (e.g., DS1 digroups) are delivered to the line interface unit 21. As the name implies, the interface unit 21 interfaces the bit compression multiplexer (BCM) of FIG. 2 to other equipment. The interface circuitry will typically include an equalizer circuit for the equalization of gain and/or delay distortion, detectors for facility performance monitoring, provision for DS1 loopback for maintenance, bipolar-to-unipolar conversion, etc. The line interface circuitry is conventional in design and its functions well known to those skilled in the art. One circuit of interface 21 contains reference clock extraction circuitry which generates a "bit clock" signal from one of the input DS1 signals. Another interface circuit serves to extract the signaling bits of the input DS1 signals; signaling bit extraction is a standard feature of all digital channel banks, for example.

The synchronization generator (or BCM clock) 22 is "slaved" to the network timing provided by the aforementioned reference clock extraction circuit. A local phase-locked loop (PLL) of generator 22 locks its oscillator to the 1.544 Mhz line clock. The sync generator circuit generates the local clocks and tailored synchronization signals required by the various (block) functions of the FIG. 2 system. In particular, it generates the (FIG. 4) timing signal(s) utilized by the bit compression circuit 23.

The interface unit 21 delivers the pair of TDM signals to the bit compression circuit 23. For convenience and hardware simplicity, the TDM output signals from interface 21 should preferably be frame aligned (by buffering). As explained, the circuit 23 serves to bit compress each of the received 8-bit PCM encoded signals to a 4-bit ADPCM signal and periodically (every 6th frame) the least significant bit of each 4-bit signal is preempted for signaling bit insertion purposes. The bit compression algorithm of the invention is a modification of the algorithm of the cited Petr application in that the signaling bit insertion function is incorporated into the ADPCM coding process. The bit compression circuit 23 will be described in greater detail hereinafter.

The bit compressed TDMs (e.g., compressed DS1 signals) are multiplexed with each other in the multiplexer 24 to achieve the bit compressed multiplexed signal shown in FIG. 1. There are, of course, a number of ways of multiplexing the compressed data signals. For purposes of explanation, it is assumed that the channels of the two compressed digroups are interleaved (A1, B1, A2, B2 . . . A24, B24). Alternatively, the first 24 channels of the FIG. 1 format could be dedicated to the 24 channels originating from digroup A, with the last 24 channels of the FIG. 1 format dedicated to the channels originating from digroup B. Still other multiplexing arrangements should be readily apparent. The described multiplexing operation is straightforward and can be implemented by a state-of-the-art multiplexer or even by use of a RAM.

The extracted signaling bits from interface 21 are delivered to the store 25, which can comprise a random-access-memory (RAM) or any other suitable state-of-the-art storage device. The extracted signaling bits are written into respective storage locations of the RAM. These storage locations are then accessed or read out in a predetermined manner so that the sequence of signaling bits on the RAM output lead(s) 26 corresponds to the sequence in which these bits are to be inserted into the signaling frames. For the format shown in FIG. 1, the signaling bits appear sequentially on respective leads 26. For example, for the FIG. 1 format, the signaling bits of the A1, A2, A3 . . . channels appear in that sequence (A1 S-bit, A2 S-bit . . . ) on a lead 26. However, for other and different multiplexing arrangements, the S-bit sequence on lead(s) 26 might, of course, be different. Thus the RAM, in effect, can function to reformat the signaling bits in accordance with the manner in which the compressed data signals are multiplexed. However, regardless of how the data signals are multiplexed, the signaling bits are not altered or changed in any way. The signaling bit read-out from the RAM occurs, of course, every 6th frame.

The bit compressed, time division multiplexed signal (BC TDM) is coupled to the line interface unit 27, which interfaces the bit compression multiplexer to the transmission network. This interface performs a number of known conventional functions, such as unipolar-to-bipolar conversion, as well as the addition of D3/D4 type frame bits to the outgoing digital bit stream. Alternatively, the more recent, extended superframe bits (Fe) might be added at this point.

Figure 3:
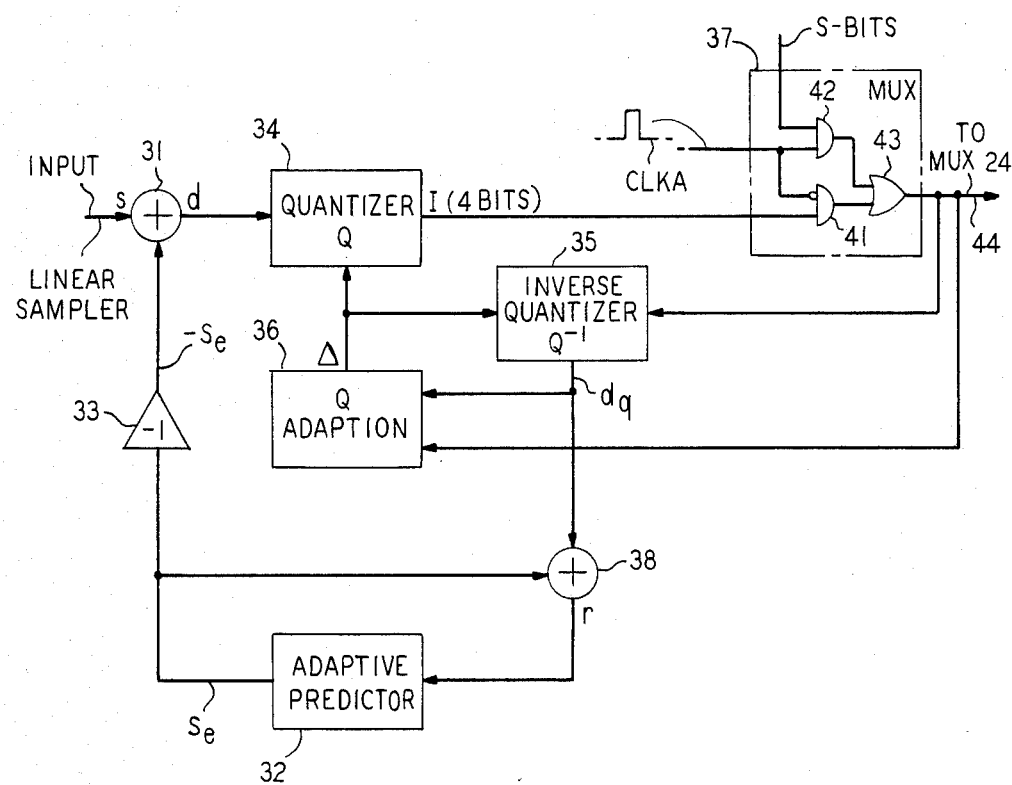
FIG. 3 is a schematic block diagram of the bit compression coding circuit of the invention.

The bit compression coding circuit 23 is shown in greater detail in FIG. 3. As previously described, this circuit serves to bit compress 8-bit PCM encoded signals to 4-bit ADPCM signals. Each 8-bit μ-Law (or possibly A-Law) PCM signal is first converted to a multi-bit (e.g., 13-16 bits) linear PCM sample. The linear PCM samples s are delivered to an algebraic adder or difference circuit 31.

An adaptive predictor 32 provides a predicted signal $s_e$ which is a prediction or an estimate of the sample s. This predicted signal $s_e$ is inverted in inverter 33 and delivered to the other input of the adder circuit 31. As the name implies, the latter circuit provides at its output a difference signal d that is the algebraic addition of the two inputs thereto. The difference signal d is coupled to the input of the adaptive quantizer 34.

The Q quantizer 34, the $Q^{-1}$ inverse quantizer 35, and the Q adaptation circuit 36, in combination with the adaptive predictor 32, serve to encode the input linear PCM samples into 4-bit differential PCM signals.

The quantizer 34 comprises a multi-level nonuniform adaptive quantizer of scale factor $\Delta$; for n=4, a 16-level quantization is possible. As will be appreciated by those in the art, the quantizer 34 not only provides the desired quantization, but it also serves to PCM encode the input signal; the quantizing and encoding are carried out in one-and-the-same operation (see any standard digital transmission text). The 4-bit output signal I represents the quantized and PCM encoded form of the difference sample d.

This 4-bit PCM output is delivered to the multiplexer circuit 37, which serves to periodically preempt the least significant bit of each 4-bit PCM signal (every 6th frame) and substitute an appropriate signaling bit for the same. This multiplexing or S-bit insertion operation will be described in greater detail hereinafter. The 4-bit output signals of the multiplex circuit 37, including the multiplexed signaling bits, are delivered to the $Q^{-1}$ inverse quantizer 35 which, as the designation implies, performs an operation that is essentially the inverse of the operation of block 34. That is, the inverse quantizer 35 receives a 4-bit signal and provides at its output the signal $d_q$. This $d_q$ signal is a close quantized version of the difference signal d. The signal $d_q$ is coupled to the input of the Q adaptation circuit 36 and to the adder 38. The $s_e$ output of the adaptive predictor 32 is also coupled to an input of the adder 38. The adder 38 serves to add these two input signals so as to provide at its output the reconstructed signal r, which is a close quantized version of the input signal s. The signal sample r is delivered to the adaptive predictor 32, which in response thereto serves to generate the next predicted signal for comparison with the next linear PCM sample. The adaptive predictor 32 uses the sample r and a few previous samples to arrive at a prediction $s_e$ which is the weighted sum of m input samples (e.g., m=4).

The Q adaptation circuit 36 receives the quantized difference signal $d_q$ and the 4-bit output of circuit 37 and serves to develop therefrom the adaptive scale factor $\Delta$. This scale factor $\Delta$ is then delivered to the quantizer 34 and to the inverse quantizer 35. The adaptive scale factor $\Delta$ serves to scale the Q and $Q^{-1}$ characteristics to match the power of the input difference signal d. The Q adaptation circuit controls the speed of adaptation of the scale factor $\Delta$; a fast speed of adaptation is provided when the input linear PCM signal represents speech, with a very slow (almost constant) speed of adaptation for input PCM encoded voiceband data or tones. The ADPCM coding per se is covered in greater detail in the cited Petr application.

Figure 4:
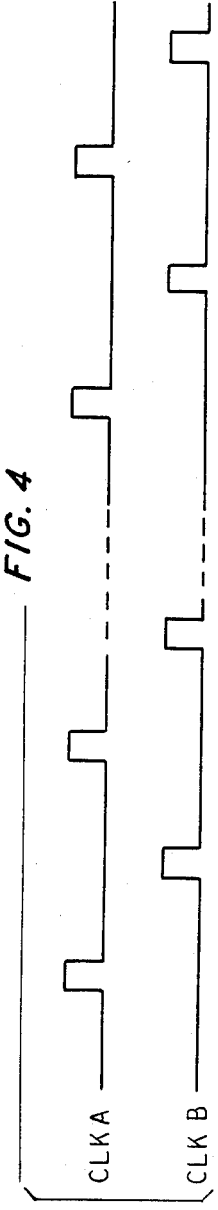
FIG. 4 shows waveforms useful in the explanation of the operation of the FIG. 3 circuit.

The multiplexer or S-bit insertion circuit 37 comprises a pair of AND gates 41, 42 and on OR gate 43. The 4-bit output signal I is normally coupled to the output lead 44 via the AND gate 41 and OR gate 43. However, every sixth frame the sync generator 22 generates bit insertion clock signals such as shown in FIG. 4. The CLK A signals, for example, are time coincident with the least significant bits of the bit compressed A digroup (compare FIG. 1, frame 1, and FIG. 4). A CLK A signal from generator 22 is delivered to the gates 41, 42 to enable gate 42 and thereby couple an S-bit from the RAM 25 to the output lead 44 via OR gate 43. At the same time, the gate 41 is inhibited to effectively preempt a differential PCM bit for signaling purposes. This multiplexing or signaling insertion operation is, of course, straightforward and can be carried out in a number of ways.

A pair of coders such as shown in FIG. 3 can be used to respectively bit compress the 8-bit PCM signals of the TDM bit streams on a time shared basis. And, since the described coding operation can be carried out digitally, it is all readily implemented using a digital signal processor.

As will be appreciated by those skilled in the art, the demultiplexer and decoder (bit expansion) circuits are essentially mirror images of the multiplexer 24 and coder 23 with which they interact, remotely. This remote interaction of the receiver apparatus is coordinated with the transmitter apparatus by the frame bits in accordance with standard operating procedures. As with D3/D4 Channel Banks, for example, the signaling framing bits of the frame format advise the remote terminal when to expect a signaling frame.

Digital data (e.g., 56 Kbps data) may be integrated with voice encoded channels to add further network capability. In this case, a 64 Kbps channel is inserted or used in place of channels A1 and B1, for example. Since digital data must not be bit compressed, the coder 23 is made transparent to digital data—i.e., the coder is temporarily placed in a by-pass mode for digital data.

The bit compression coding technique of the present invention is particularly advantageous for the transmission of PCM encoded voiceband data. It's signal-to-noise performance is approximately 15 dB. better than the (previously discussed) straightforward preemption (every 6th frame) of one of the four bits of sub-rate (32 Kbps) channels.

The foregoing disclosure is merely illustrative of the principles of the present invention and numerous modifications or alterations may be devised by those skilled in the art without departing from the spirit and scope of the invention.

What is claimed is:

1. A bit compression coding circuit for converting a PCM input signal representative of PCM encoded speech or voiceband data into a bit compressed quantized differential PCM output signal with embedded signaling bits comprising a difference circuit (31) to which samples of the PCM input signal and a signal estimate of the same are coupled, said difference circuit providing an output difference signal indicative of the difference between the two inputs thereto, a predictor means (32) for producing said signal estimate, adaptive quantizing means (34) for receiving said difference signal and providing at its output a bit compressed quantized differential PCM version of the difference signal, multiplex means (37) coupled to the output of said quantizing means for periodically preempting the least significant bit of the bit compressed PCM signal and substituting a signaling bit therefor, means (35, 38) coupled to the output of said multiplex means for adding the signal therefrom with said signal estimate, the output of the adding means (r) being coupled to the input of the predictor means which in response thereto serves to generate the next signal estimate for comparison with the next input signal sample, and adaptation means (36) responsive to the output of said multiplex means for controlling the speed of adaptation of said quantizing means to produce a fast speed adaptation when the PCM input signal represents speech and a slow speed of adaptation for PCM encoded voiceband data.

2. A bit compression coding circuit as defined in claim 1 wherein the bit complexed PCM signal comprises 4 bits.

3. A bit compression coding circuit as defined in claim 2 wherein the least significant bit of each bit compressed PCM signal is preempted every sixth frame for signaling bit substitution.

4. A bit compression coding circuit as defined in claim 3 wherein the PCM input signal consists of 8-bit $\mu$-Law PCM encoded signals.

5. A bit compression coding circuit as defined in claim 4 wherein a frame of bit compressed multiplexed signals is of the same duration as a frame of PCM input signals.

6. A bit compression coding circuit as defined in claim 5 wherein said coding circuit comprises an adaptive differential pulse code modulation coder.

* * * * *